May 2, 1967　　　　　E. J. HOLDEN　　　　　3,317,125
CENTRIFUGE HAVING HEAT SENSITIVE PROBE
AND TEMPERATURE CONTROL MEANS
Filed Jan. 13, 1964　　　　　　　　　　　2 Sheets-Sheet 2

Inventor
Edward John Holden
By Cushman, Darby & Cushman
Attorneys 3,317,125
CENTRIFUGE HAVING HEAT SENSITIVE PROBE AND TEMPERATURE CONTROL MEANS
Edward John Holden, Crawley, England, assignor to M.S.E. Holdings Limited, London, England, a British company
Filed Jan. 13, 1964, Ser. No. 337,319
Claims priority, application Great Britain, Jan. 15, 1963, 1,860/63
10 Claims. (Cl. 233—11)

This invention relates to centrifuges and is concerned more particularly with the control and/or measurement of the temperature of centrifuge rotors. In accordance with the invention there is provided a centrifuge apparatus comprising: a centrifuge casing operable with a vacuum in said casing; a rotor rotatably mounted in said centrifuge casing and containing pockets for receiving material for batch processing by centrifugal action; an axially-disposed axially-open recess in said rotor; a heat sensitive passive and resistive probe member for sensing heat by radiation; support means for supporting said probe member stationarily in said recess free of said rotor; and an electrical circuit including said probe member for producing an electrical signal related to the temperature of said rotor.

For a better understanding of the invention and to show how the same may be carried into effect, reference will now be made, by way of example, to the accompanying drawings in which.

Figure 1:
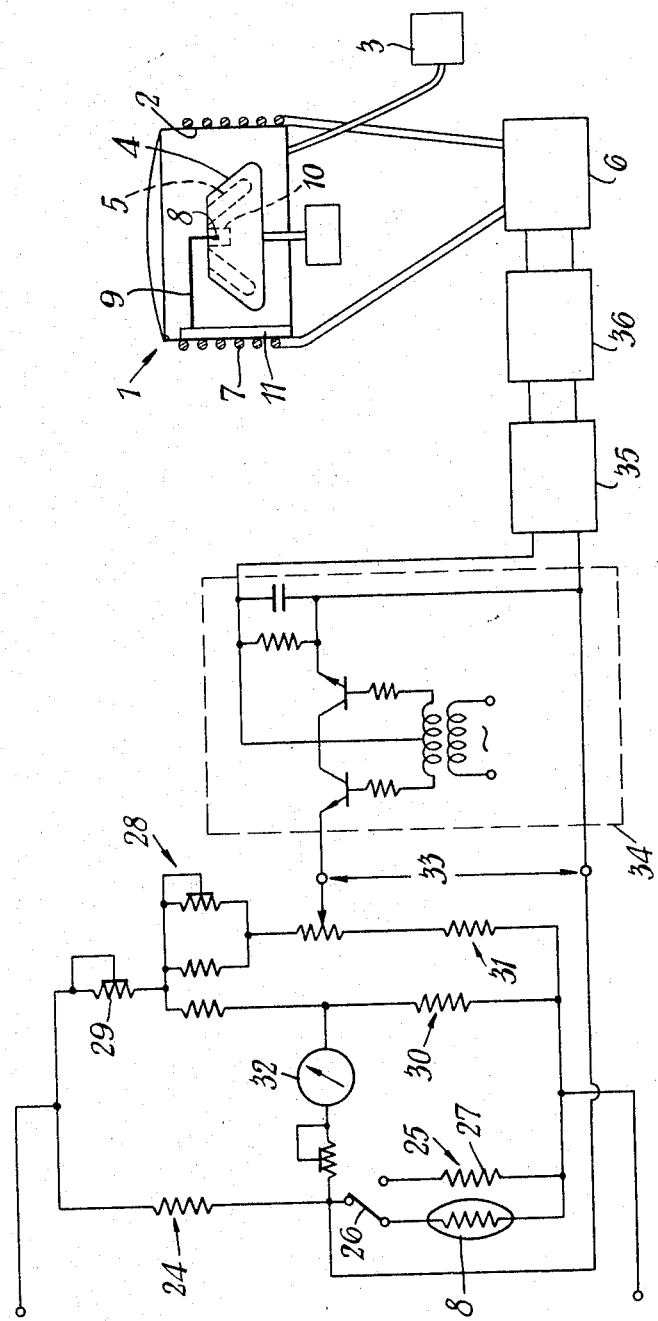
FIGURE 1 is a diagram of a centrifuge in combination with a circuit diagram of a control circuit.

FIGURE 1 shows a centrifuge 1 composed of a vacuum tight bowl 2 connected to a vacuum pump 3 and containing a rotatable head or rotor 4 within pockets 5 of which centrifugal action is arranged to take place on rotation of the rotor 4. For temperature control of the bowl 2 a refrigerator 6 is provided, a coil 7 of which refrigerator surrounds the bowl 2.

To sense the temperature of the rotor a heat sensing passive probe 8, for example a thermistor or a platinum wire contained in a stainless steel tube, is employed, the probe being arranged to effect sensing by way of heat radiation received or emitted by it, as the case may be.

The probe is mounted in an adjustable arm arrangement 9 (FIGURES 2 and 3) constructed from plastic, for example polypropylene, whereby the probe 8 can be inserted in an aperture 10 in the centre of the rotor 4, or can be placed in close proximity to any part of the rotor 4 whatever its size.

Figure 2:
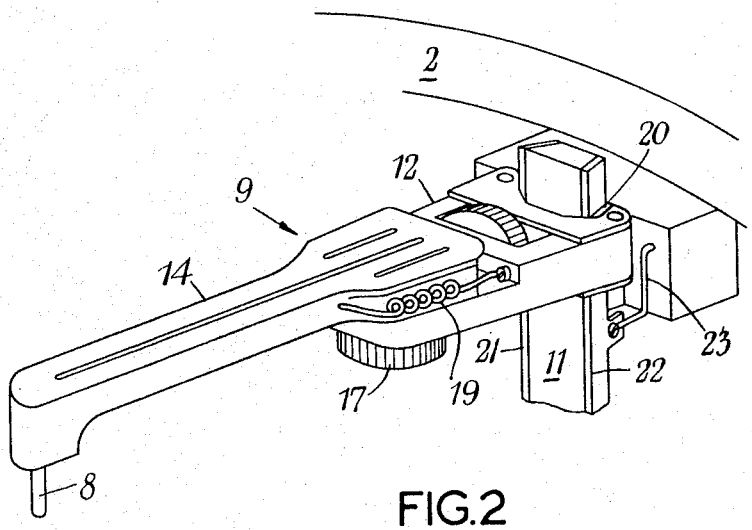
FIGURE 2 is a perspective view of a probe-carrying adjustable arm.
Figure 3:
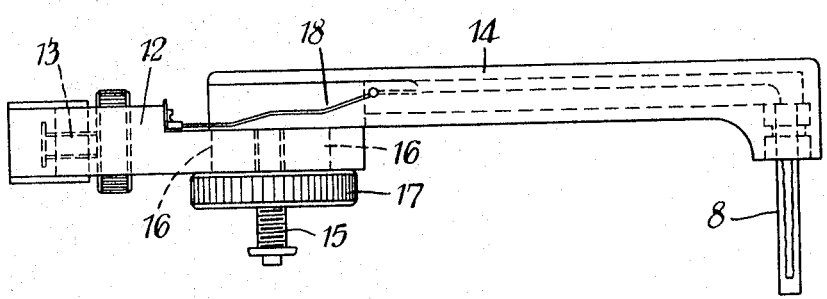
FIGURE 3 is an elevational view of the adjustable arm.

Referring now to FIGURE 2, the arm arrangement 9 comprises a support member 11 secured to the bowl 2 and an arm 12 dovetailed to the support member 11 in order to permit vertical sliding movements of the arm 12, which may be held in any desired vertical position by the action of a screw 13 threaded in the arm 12 in such a manner as to be capable of abutting the support member 11 on being turned in one direction. A probe carrying arm 14 is carried by the free end of the arm 12. A stud 15 projecting from the arm 14 extends through a slot, indicated by dotted lines 16, in the arm 12, and a locking nut 17 is provided on the stud 15. It will be seen that this arrangement provides an extendable and rotatable joint. The probe 8 is fixedly mounted in the arm 14, two leads 18 and 19 for the probe running for most of their length interiorly of the arm 14 and terminating at contact strips 20 disposed in the dovetail slot in the arm member 12. The corresponding dovetailed portion of the support member 11 also carries a pair of contact strips 21 and 22, each engaging a respective one of the pair of contact strips 20 in the arm member 14. Wires 23 are fed from the contact strips 21 and 22 of the support member 11 to a bridge circuit illustrated in FIGURE 1.

The bridge circuit comprises two identical direct-current Wheatstone bridges having two adjacent resistance arms 24 and 25 in common, the probe 8 comprising the arm 25. The arm 25 also includes a switch 26 whereby a calibration resistance 27 may be substituted for the probe 8.

A third arm 28 of both bridges contains a common adjustable calibration resistance 29 whilst the fourth arms 30 and 31 of the bridges are independent. The output of the first bridge is connected to an electrical meter 32 for recording the temperature of the rotor of the centrifuge, and the output 31 of the second bridge is connected to a refrigerator control circuit.

This control circuit comprises a transistor chopper arrangement 34, for converting the direct current output signal of the bridge to an alternating signal, a transistor amplifier 35 for amplifying this latter signal, and a control circuit 36 comprising rectifier means and a relay which is arranged to control the refrigerator 6.

With the above-described arrangement it is possible to indicate and effect a control in response to the temperature of rotors of various sizes by using the calibration resistance 29 in the bridge circuit and calibration marks on the output meter 32. With one size of rotor, and the refrigerator coil 7 operating at, say, —40° C., the centre of the rotor may be at 0° C. whilst the outer rim may be at —5° C. In this case the inner pockets 5 of the rotor may be at —3° C. With the probe situated centrally with respect to the rotor it will be seen that the bridge output meter 32 must be calibrated to indicate a temperature 3° C. lower than the actual temperature in order that the reading may give the true internal temperature of the rotor. With a larger rotor having a central temperature of, say, —10° C. and an outer rim temperature of —20° C., the internal temperature may be about —14° C., requiring the meter 32 to give a temperature reading 4° C. lower than the actual temperature. To compensate for the temperature differential in various sizes of rotor, the bridge circuit is permanently off-balanced by means of the calibration resistance 29 and the output meter calibration markings are chosen to suit the various sizes of rotor which may be employed in the centrifuge.

Thus, owing to the identity of the combined bridges, by off-balancing one bridge to obtain a correct temperature indication, the other bridge is also off-balanced to an identical extent. The whole system is thus capable of indicating and controlling the centrifuge rotor temperature regardless of size or speed of operation of the rotor.

I claim:
1. A centrifuge apparatus comprising: a centrifuge casing operable with a vacuum in said casing; a rotor rotatably mounted in said centrifuge casing and containing pockets for receiving material for batch processing by centrifugal action; an axially-disposed axially-open recess in said rotor; a heat sensitive passive and resistive probe member for sensing heat by radiation; support means for supporting said probe member stationarily in said recess free of said rotor; and an electrical circuit including said probe member for producing an electrical signal related to the temperature of said rotor.

2. A centrifuge apparatus according to claim 1, wherein said probe is a platinum wire.

3. A centrifuge apparatus according to claim 1, wherein said support means is an arm carried by said casing and the apparatus further comprising means for adjusting said arm in respect of its length and in respect of its position in a direction parallel to the axis of rotation of said rotor.

4. A centrifuge apparatus according to claim 3 and further comprising means for angularly adjusting said arm about an axis parallel to the axis of rotation of said rotor.

5. A centrifuge apparatus according to claim 1, wherein said circuit has indicating means for indicating the temperature of said rotor.

6. A centrifuge apparatus according to claim 1, and comprising temperature control means connected to said electrical circuit for controlling the temperature within said casing.

7. A centrifuge apparatus comprising: a centrifuge casing operable with a vacuum in said casing; a rotor rotatably mounted in said centrifuge casing and containing pockets for receiving material for batch processing by centrifugal action; an axially-disposed axially-open recess in said rotor; a heat sensitive passive and resistive probe member for sensing heat by radiation; support means supporting said probe member stationarily in said recess free of said rotor; first and second pairs of arms constituting a first bridge circuit having an output and the first pair of arms including said probe member; a third pair of arms defining with said first pair of arms a second bridge circuit having an output; temperature indicating means connected to said first bridge circuit output; and temperature control means connected to said second bridge circuit output for controlling the temperature within said casing.

8. A centrifuge apparatus according to claim 7, wherein said probe member consists of a platinum wire.

9. A centrifuge apparatus according to claim 7, and comprising an adjustable calibration resistance, common to the second and third pairs of arms of said bridge circuits.

10. A centrifuge apparatus according to claim 7, wherein there is connected between said second bridge circuit output and said temperature control means a direct-current to alternating current converter and an alternating current amplifier.

References Cited by the Examiner
UNITED STATES PATENTS

| | | | |
|---|---|---|---|
| 1,458,165 | 6/1923 | Coblentz | 250—83.3 X |
| 1,791,938 | 2/1931 | Schroeter et al. | |
| 2,771,579 | 11/1956 | Ruge. | |
| 2,885,188 | 5/1959 | Pickels et al. | 233—26 |
| 2,980,852 | 4/1961 | Mell | 324—62 X |
| 3,246,688 | 4/1966 | Colburn | 165—39 |

M. CARY NELSON, *Primary Examiner.*

HENRY T. KLINKSIEK, *Assistant Examiner.*